Figure 1:
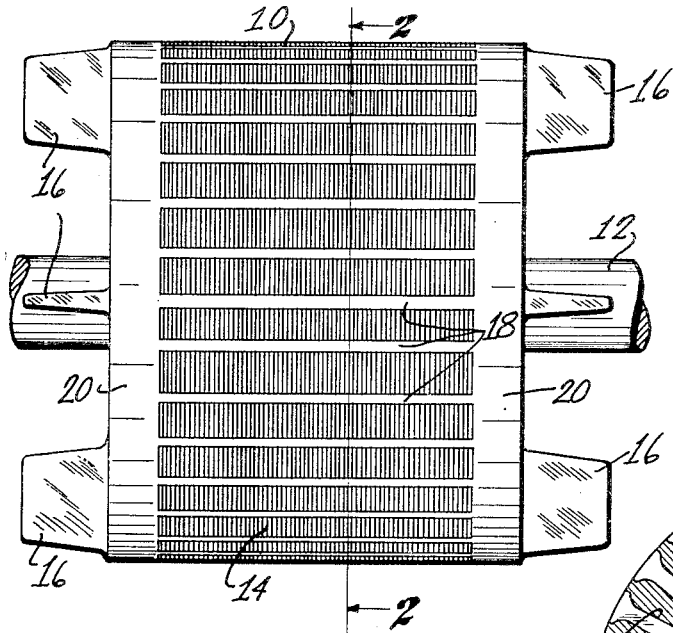

June 18, 1935.  E. W. PETERSEN ET AL  2,005,201

INDUCTION MACHINE

Filed Nov. 9, 1932

INVENTOR.
EYVIND W. PETERSEN.
WILLIAM A. SINGER.
BY
Ray M Eilers
ATTORNEY.

Patented June 18, 1935

2,005,201

UNITED STATES PATENT OFFICE 2,005,201

INDUCTION MACHINE

Eyvind W. Petersen, Beloit, Wis., and William A. Singer, Chicago, Ill., assignors to Fairbanks, Morse & Co., Chicago, Ill., a corporation of Illinois Application November 9, 1932, Serial No. 641,818

2 Claims. (Cl. 172—120)

This invention relates to improvements in electrical machines, and more particularly to improvements in rotor constructions for induction motors or the like.

In older prevailing types of induction motors, it is usual to provide the secondary member or rotor with windings of suitable conducting wires, or bars laid in radial slots or openings in the laminated core. This method of winding rotors has proven relatively expensive in many instances, and has often resulted in the conductors working loose or shifting in the slots, thereby causing defective rotors through ruptured or worn insulation, permitting short circuit contact between adjacent conductors in the slots.

In certain of the older prevailing types of induction machines, the rotor windings have been cast in unitary, monolithic or molecularly united form. Although such cast windings have decided advantages over the older wound type of rotor, numerous difficulties have been encountered which have made the loss through imperfections in the cast windings exceedingly high, since, as is well understood in the art, any appreciable variation in the cross sectional area of any winding bar at any place in its length, will render the entire rotor unusable. Furthermore, it has been found that in casting windings in place, the molten alloy or other winding material chills before the winding slots are completely filled, resulting in voids or blow holes which render the rotor defective. However, many of the above enumerated defects and difficulties have been eliminated, or diminished in great part, by pouring the molten alloy or winding material into the winding recesses, under pressure, thus to insure complete and uniform filling of the recesses, and assuring against objectionable or fatal variations in the cross sectional areas of the winding bars. In die casting the windings in this manner, the core need not be preheated, a precaution which could not be overlooked in the older method of casting the windings. As will appear hereinafter, the windings in the present invention are preferably die cast in the form of a unitary winding element.

An object of the present invention is attained in a winding material consisting of an improved metal alloy, which is particularly adapted for die casting rotor windings of induction motors. The improved winding material is composed of a zinc base alloy containing from one to ten percent, preferably about four percent (4%) of aluminum, together with a trace of magnesium, and the balance of a high grade zinc. An alloy of the above composition has been found to provide a highly satisfactory winding material which will practically retain its original impact strength, and which will not expand, after ageing, to any great extent, a problem which has been encountered with alloys containing zinc, aluminum and copper. The introduction to the alloy of a trace of magnesium, has been found to reduce intercrystalline oxidation to a great extent, and to minimize any tendency of the material to change its physical properties upon ageing.

Figure 2:
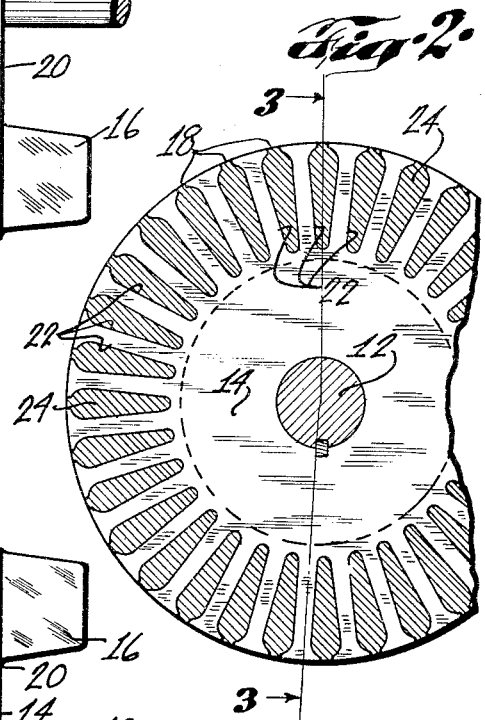

Further objects and advantages will appear from the following detailed description of the invention, and from the drawing, in which:

Fig. 1 is a longitudinal elevation of a completed rotor element incorporating the features of this invention; Fig. 2 is a section taken along line 2—2 of Fig. 1, and Fig. 3 is a section taken along line 3—3 in Fig. 2.

Referring now by numerals of reference to the drawing, 10 represents, generally, a preferred form of rotor which consists of a usual rotor shaft 12, a soft iron core 14 generally composed of a stack of soft iron punchings or laminations, fan blades 16, a winding 18 and end rings 20, connecting the ends of the winding elements. The shape of winding slots 22, punched or otherwise formed in the core laminae, is preferably as shown in Figs. 1 and 2, but the laminae may be assembled so that the slots are angularly off-set relative to the axis of the rotor to give other characteristics to the motor, as desired.

Figure 3:
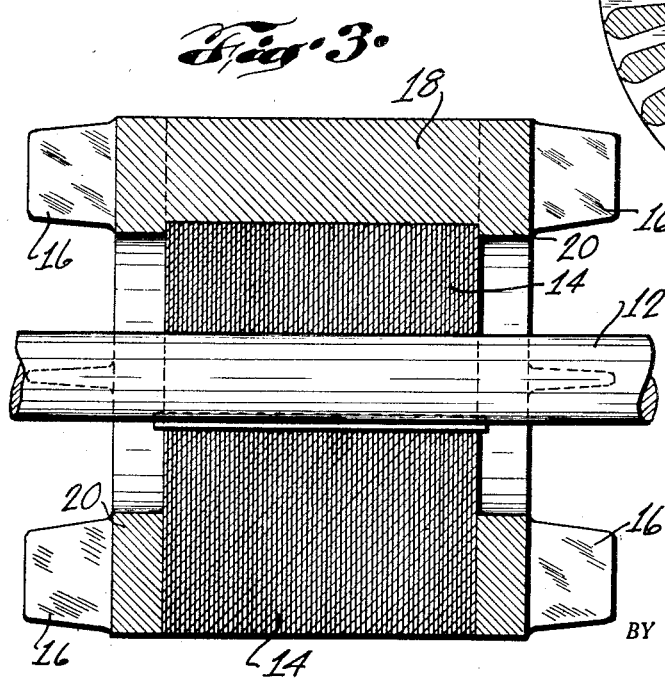

As illustrated in Fig. 3, the winding bars 18 and end rings 20 are unitary, and if desired, the fan blades 16 may be included as integral extended portions of the end rings. The bars 18 and end rings 20 are preferably composed of the winding material or alloy as hereinbefore noted, die cast under pressure sufficient, as determined by experiment, thoroughly to fill the slots 22 to insure a uniform and solid cross section 24 of each bar throughout its operative length. Uniformity of the bars is necessary, as previously pointed out, because any appreciable variance in the cross section of one or more of the bars may result in an unserviceable rotor.

The use of the improved alloy of the composition herein noted, consisting of about four percent (4%) aluminum, a trace of magnesium, not less than one hundredth of one percent (1/100 of 1%) nor more than three-tenths of one percent ($\frac{3}{10}$ of 1%), and the balance of high grade zinc, results in a greatly improved rotor construction. The alloy is especially adapted for die casting, and by its composition, reduces the extent of physical changes in the dimensions and properties of the material upon ageing, encountered in alloys of similar composition which contain copper in quantities greater than one percent (1%). It is preferred to avoid any more than a trace of copper, and it has been found that zinc alloys containing as much as three percent (3%) copper are subject to a varying degree, to intercrystalline oxidation which frequently results in the loss of impact strength and considerable change in dimensions and physical properties of the winding alloy, upon ageing. However, with the present, improved alloy, the above noted disadvantages have been greatly eliminated, and when used in die casting the rotor bars and end rings in a rotor for an induction motor, has consequently resulted in a rotor of greatly improved operating performance and mobility.

It will be understood, of course, that the present invention relates to only a single embodiment of the invention and that modifications may be made, as well as certain departures from the exact percentages of the alloyed metals, without departing from the full intended scope of the invention, as defined in the appended claims.

We claim:

1. A rotor for an electric machine comprising, as a unitary metallically united structure, a magnetic core, and a winding and end ring portion consisting of a pressure cast alloy containing from 3% to 5% aluminum, magnesium substantially .01%, the remainder consisting of zinc of a commercial purity and characterized by the absence of more than a trace of copper, whereby the impact strength of the rotor structure is substantially increased, and the physical properties of the winding material uniformly maintained during ageing of the rotor assembly.

2. A rotor for an induction type electric motor, including a magnetic core formed of laminations assembled to provide channels for the reception of cast windings, and a pressure cast alloy consisting of substantially 4% aluminum, a trace of magnesium, and the remainder of zinc, the zinc being characterized by the absence of more than a trace of copper, said alloy filling said channels, and cast endwise of the assembled laminations to form end rings interconecting the windings in said channels, and air circulating projections cast laterally of and integrally with said end rings.

EYVIND W. PETERSEN.
WILLIAM A. SINGER.